United States Patent [19]

Eguchi et al.

[11] 4,382,665
[45] May 10, 1983

[54] AUTOMATIC FOCUSING DEVICE

[75] Inventors: Mitsuo Eguchi, Ageo; Yoshimi Kikuchi, Urawa; Nobuyuki Ichino, Warabi, all of Japan

[73] Assignee: Mamiya Koki Kabushiki Kaisha, Japan

[21] Appl. No.: 267,447

[22] Filed: May 27, 1981

[30] Foreign Application Priority Data

Oct. 20, 1980 [JP] Japan .................. 55-145622

[51] Int. Cl.³ .................. G03B 3/10; H04N 5/26; G01J 1/44
[52] U.S. Cl. ..................... 354/25; 352/140; 358/227; 250/201
[58] Field of Search ............... 354/25 R, 25 A, 25 N, 354/25 P, 31 F; 250/201, 204; 358/227; 355/56; 352/140; 356/1, 4

[56] References Cited

U.S. PATENT DOCUMENTS 4,156,563  5/1979  Kato et al. .................. 354/25 P
4,257,705  3/1981  Hosoe et al. ................. 250/201 X Primary Examiner—William B. Perkey
Attorney, Agent, or Firm—Robert E. Burns; Emmanuel J. Lobato; Bruce L. Adams

[57] ABSTRACT

An automatic focusing device in which the intensity distributions of the images of an object which are formed by light beams passing through different portions of an optical system in a photographing device are detected as video signals. A correlation output is obtained from the video signals so that the focusing condition is detected from the peak position of the correlation output. When the peak position is not one for focalization, a drive direction signal is delivered to drive the optical system towards the focusing position. A low contrast detecting circuit is provided in which is counted how many times the correlation output becomes higher than a predetermined level in one focusing condition detecting operation, and when the count value reaches a predetermined value, the drive direction signal is made ineffected, so as to prevent the occurrence of a hunting phenomenon with the optical system.

2 Claims, 29 Drawing Figures

BRIGHT

DARK

IMAGE A

IMAGE B

FIG. 7A
IMAGE A
FIG. 7B
IMAGE B
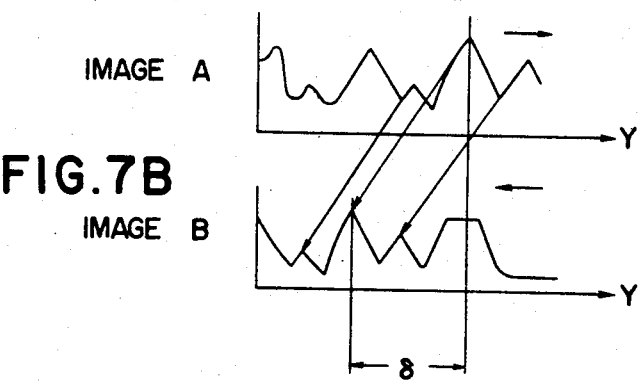
FIG. 9
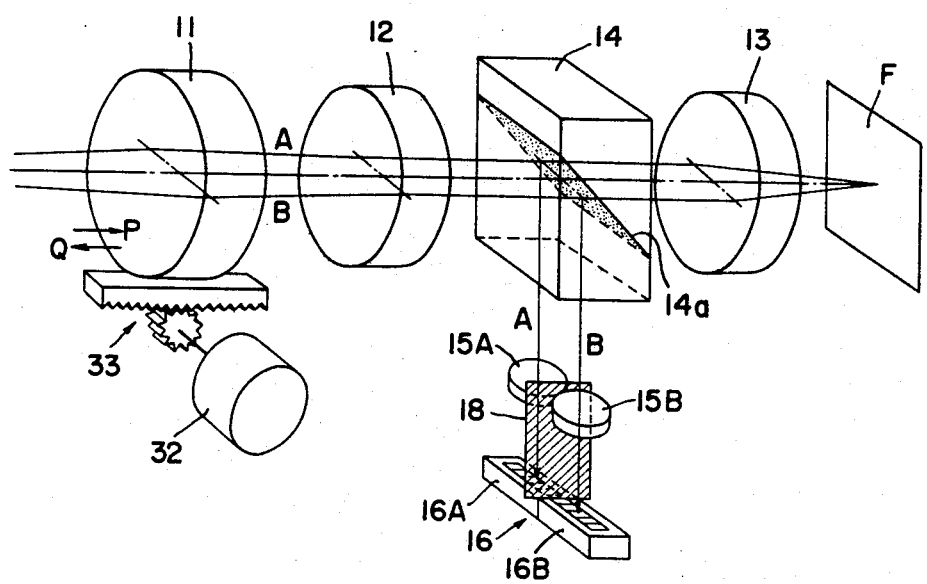

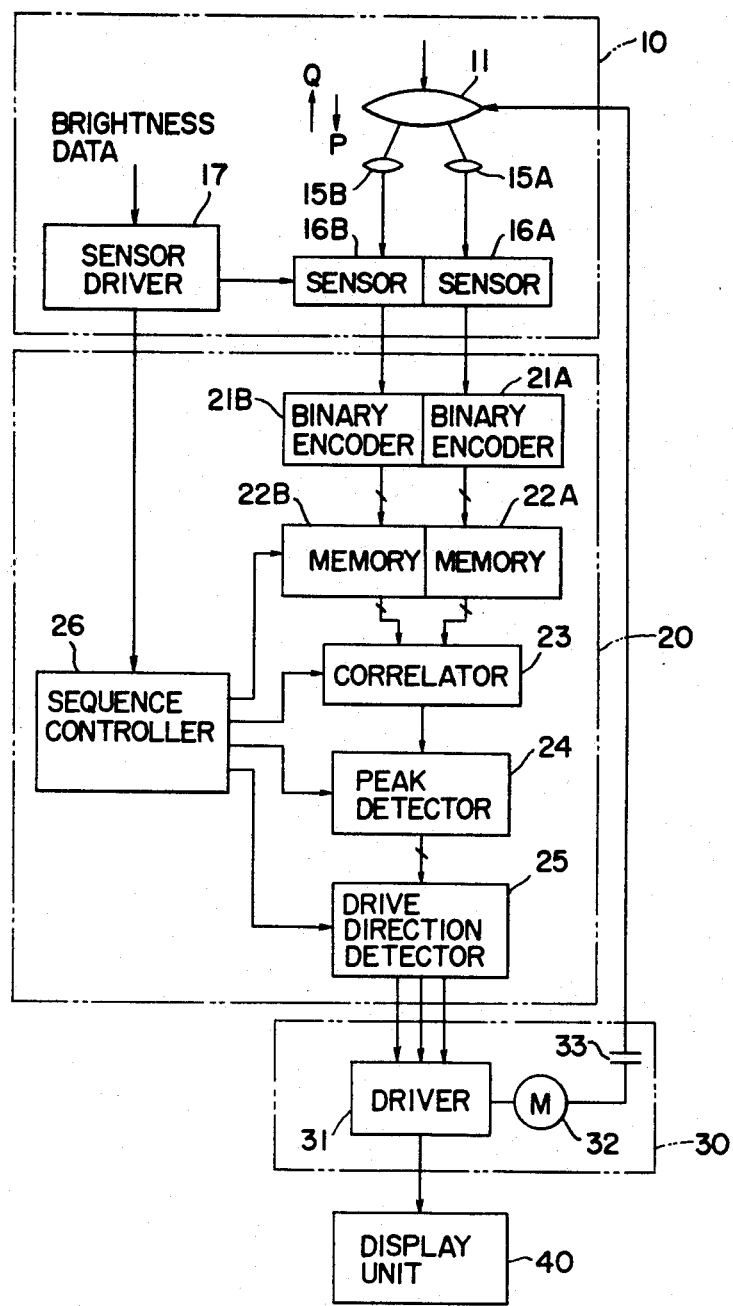

FIG. 13(a) $\phi_X$
FIG. 13(b) $\phi_1$
FIG. 13(c) $\phi_2$
FIG. 13(d) $\phi_R$

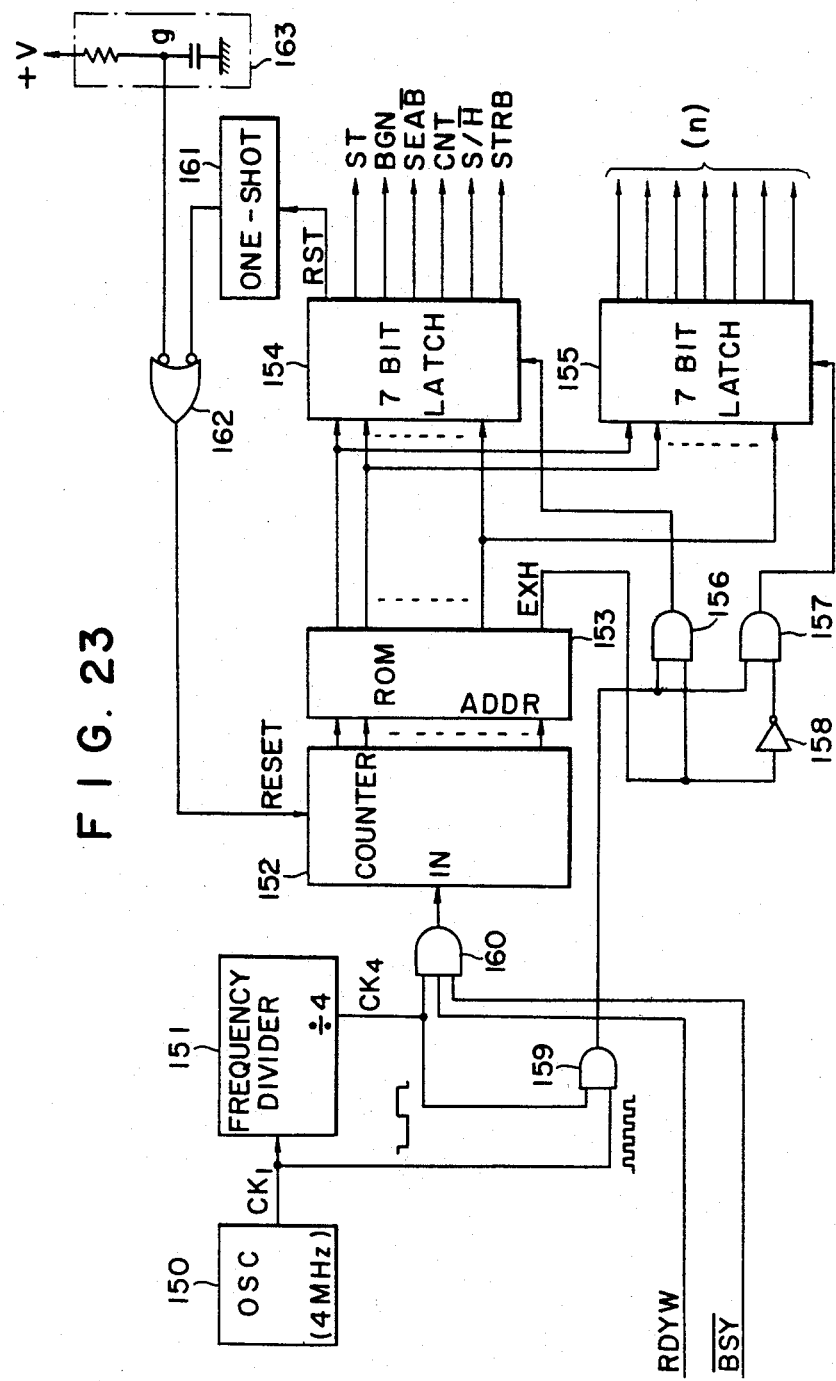
F I G. 23

AUTOMATIC FOCUSING DEVICE

BACKGROUND AND SUMMARY OF THE INVENTION

This invention relates to single lens reflex cameras, motion picture cameras and video cameras, and more particularly to an automatic focusing device in such a photographing device.

In a photographing operation, focusing and exposure are essential. Owing to the recent electronical development, the exposure can be substantially automatically determined, and accordingly the determination of exposure is not a cause that makes pictures unsatisfactory in quality.

On the other hand, a method of automatically focusing a photographing lens on an object (hereinafter referred to merely as "automatic focusing") is not sufficiently practical in use. A short focal length 35 mm camera for the beginner employing such a method has been proposed in the art. However, the camera is not ideal in that it is low in accuracy, it cannot use an interchangeable lens, and it cannot use a long focal length lens.

Recently, almost all the types of motion picture cameras have been combined with sound systems. However, it is considerably difficult for a photographer to operate the motion picture camera while controlling both the focusing of the camera and the adjustment of the sound system. Thus, there has been a strong demand for provision of an automatic focusing device excellent in operability.

In photographing objects with a video camera, a number of matters must be taken into account. For instance, the composition, the movement of a person or persons, and the background must be taken into consideration in operating the video camera. In addition to these matters, the arrangement of color in a natural color image is one of the matters which must be adjusted by the photographer through his experience at all times, because the monitor system of the video camera is a monochrome television receiver.

Recently, the exposure system or mechanism has been improved into an automatic one, and accordingly the photographer can operate a camera more readily. However, it is still considerably difficult for the photographer to precisely control the focusing through the small monitoring finder. Thus, also in this respect, the provision of an automatic focusing device is strongly required.

Automatic focusing devices according to a visitronic module system, an infrared ray system and an ultrasonic wave system are commercially available. Since the automatic focusing devices are not provided according to a system in which the focusing position is detected by utilizing the bundle of rays passing through the photographing optical system (hereinafter referred to as "a TTL system", when applicable), the devices are completely different from an automatic focusing device ideal for the above-described various photographing devices, being disadvantageous in the following points:

(1) The conventional automatic focusing devices are not free from parallax.

(2) Accordingly, it is impossible to display on the finder a part on which the photographing lens should be focused.

(3) It is considerably difficult to apply the conventional automatic focusing devices to a photographing device using a photographing lens such as a zoom lens having a focal length variable over a wide range; more specifically to a video camera, a motion picture camera, or a single lens reflex camera using an interchangeable lens.

(4) The conventional automatic focusing devices are low in accuracy.

An automatic focusing device for practicing the above-described method comprises: intensity distribution detecting means for detecting as video signals the intensity distributions of the images of an object to be photographed which are formed by light beams passing through different portions of a photographing optical system in a photographing device; a signal processing circuit in which the video signals thus detected are stored and while the relation between the video signals being subjected to relative movement little by little, the correlation of the video signals is obtained every movement, and in which the focusing condition of the photographing device is detected from the peak position of the correlation output thereof, and when the peak position is not one for focalization, a drive direction signal for moving a lens in the photographing optical system towards a focusing position is delivered; and lens driving means for moving the lens in a direction specified by the drive direction signal as long as the latter is delivered.

When an object like a grid is photographed with a camera with the above-described automatic focusing device, the correlation output has many peaks. When an object very low in contrast is photographed with the camera, the correlation output is continuously high in level. In both cases, sometimes it is impossible to detect the focusing condition from the peak position of the correlation output.

Accordingly, an object of this invention is to prevent the occurrence of the troubles that, in the above-described cases, the photographing lens is reciprocated, i.e. a hunting phenomenon occurs with the photographing lens, and as the focusing position is not detected, the photographing lens becomes unstable in operation.

More specifically, an object of the invention is to provide an automatic focusing device in which, in the above-described cases, the drive direction signal is made ineffective to stop the photographing lens, and a warning display is carried out.

The nature, principle and utility of the invention will become more apparent from the following detailed description when read in conjunction with the accompanying drawing.

BRIEF DESCRIPTION OF THE DRAWINGS

In the accompanying drawings

FIG. 7 is a diagram similar to FIG. 6 in the case where the photographing lens is out of focus;

FIG. 8 is a block diagram showing the fundamental arrangement of an automatic focusing device to which the invention is applied;

FIG. 9 is an optical path diagram showing one example of an optical system in an intensity distribution detecting section in FIG. 8;

Figure 10:
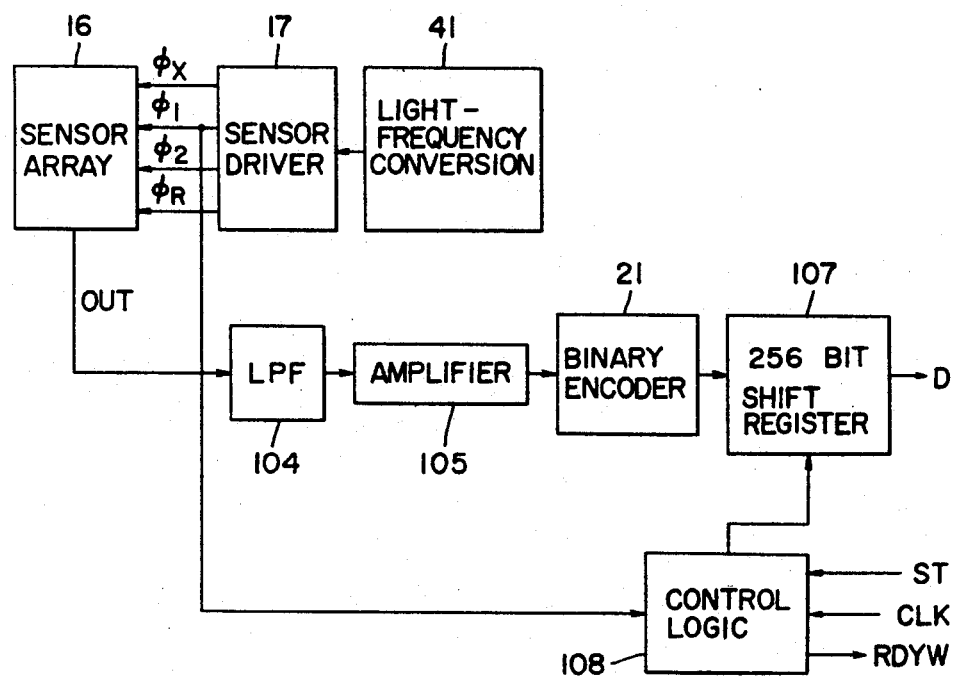
FIG. 10 is a block diagram showing one example of a data detecting section in FIG. 8.
Figure 11:
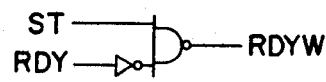
FIG. 11 is a logic circuit diagram showing the relationships between signals ST, RDY and RDYW in FIG. 10.
Figure 12:
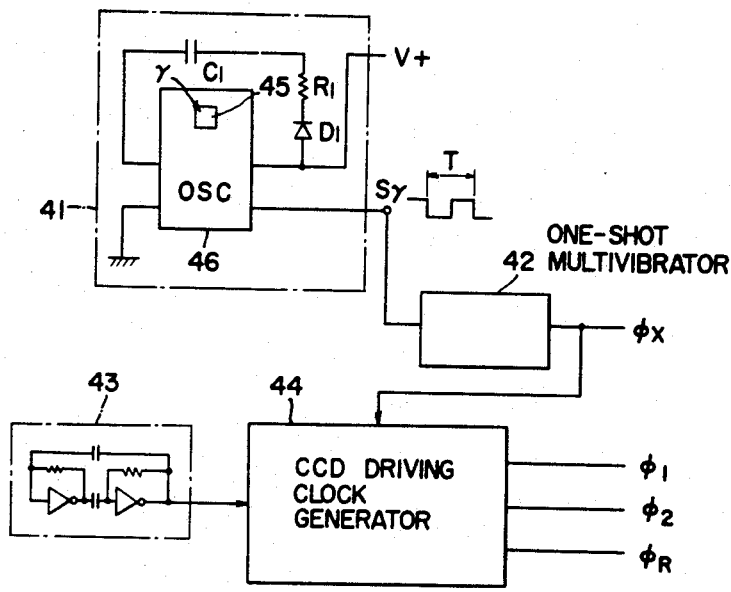
FIG. 12 is a block diagram showing examples of a light-frequency conversion circuit and a sensor driver in FIG. 10.
Figure 14:
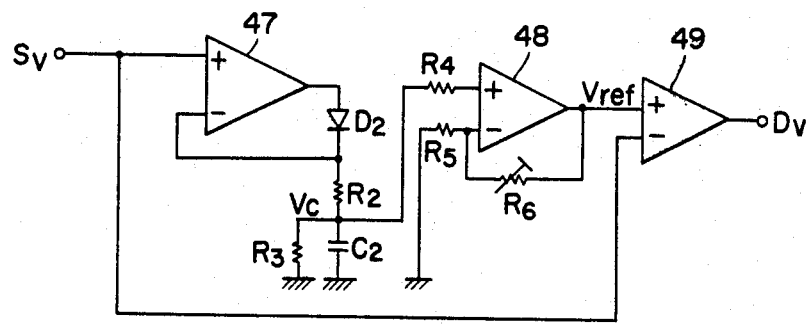
Figure 15A:
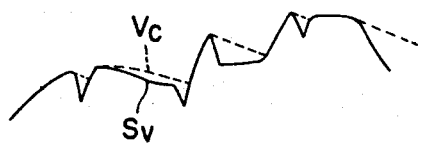
Figure 15B:
Figure 16:
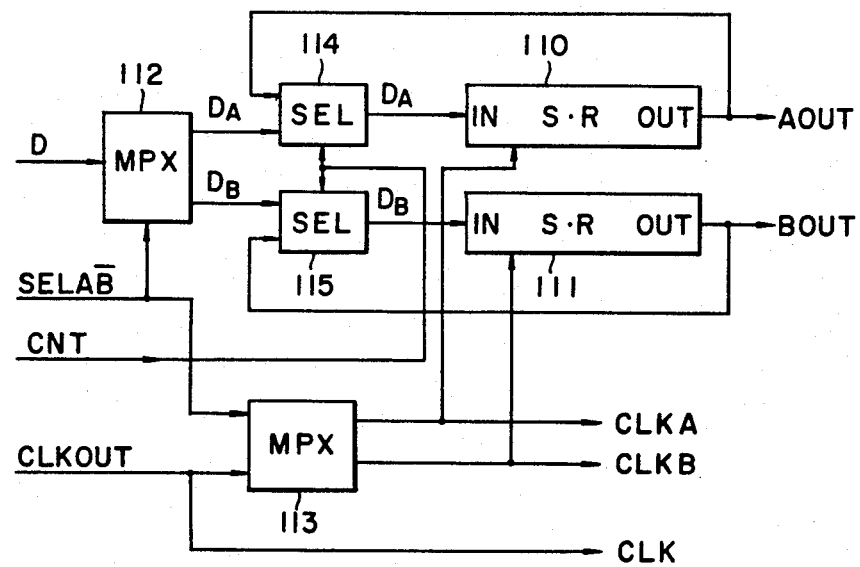
Figure 17:
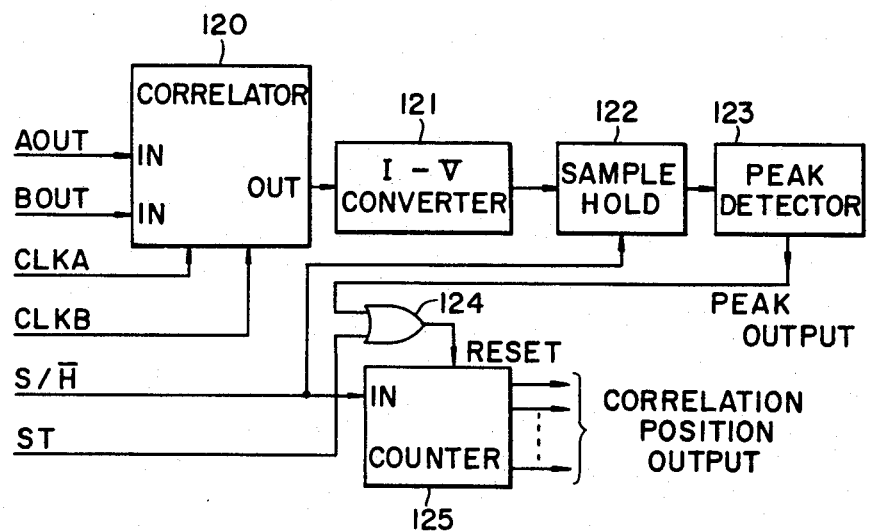
Figure 18:
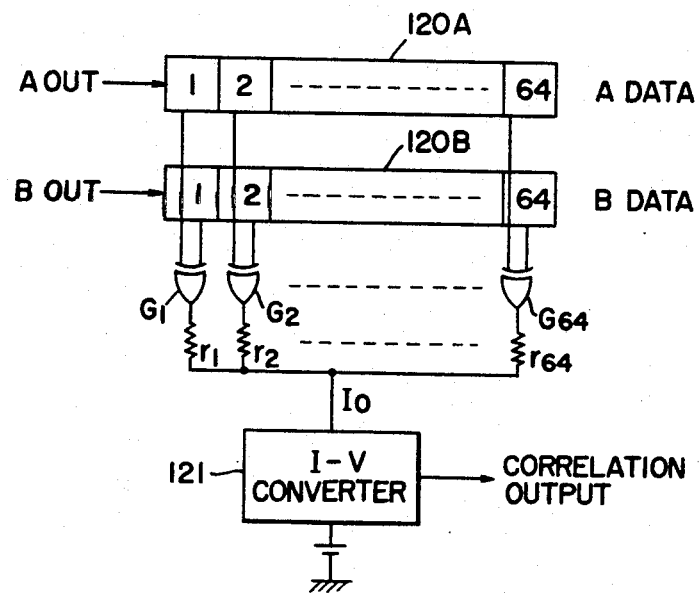
Figure 19:
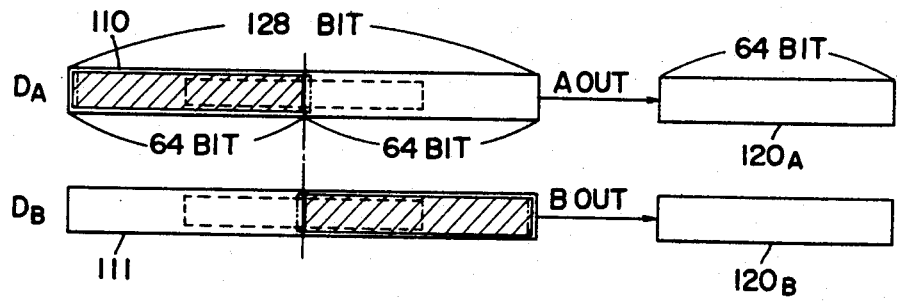
Figure 20:
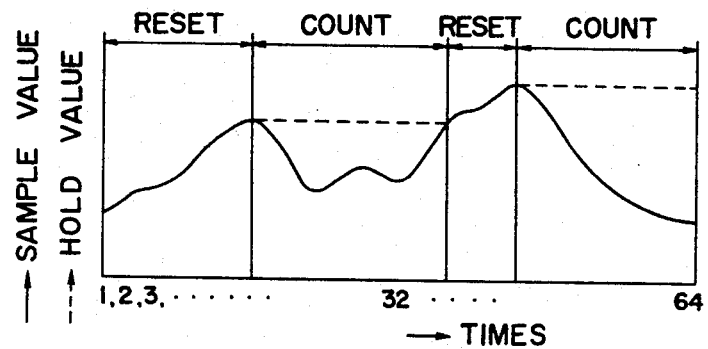
Figure 21:
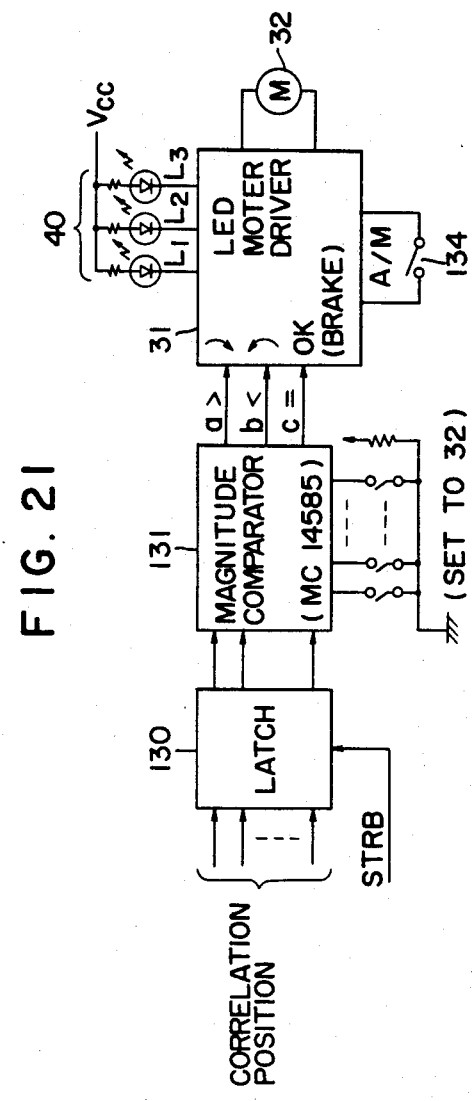
Figure 22:
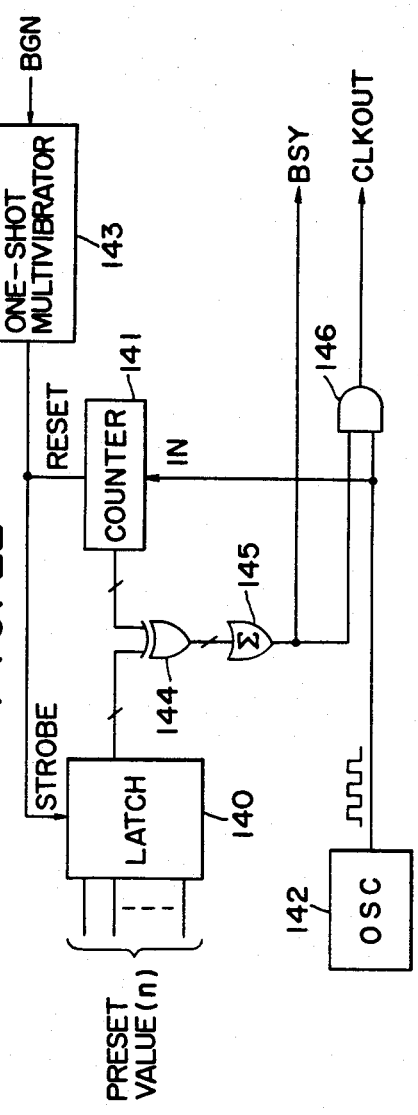
Figure 24:
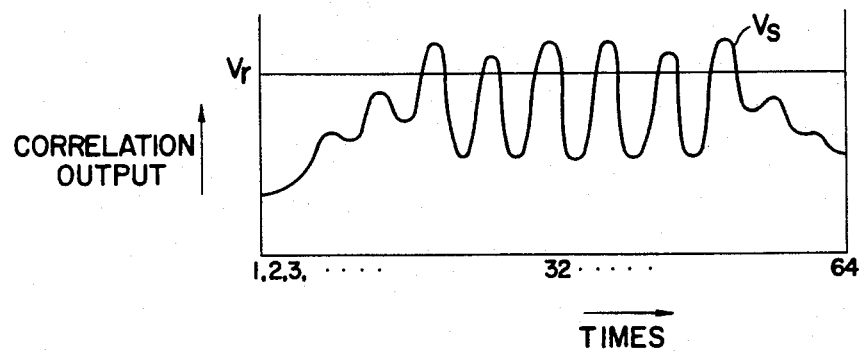
Figure 24:
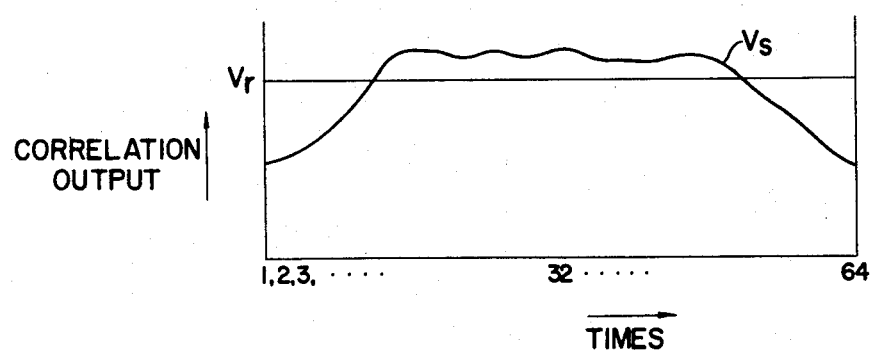
Figure 25:
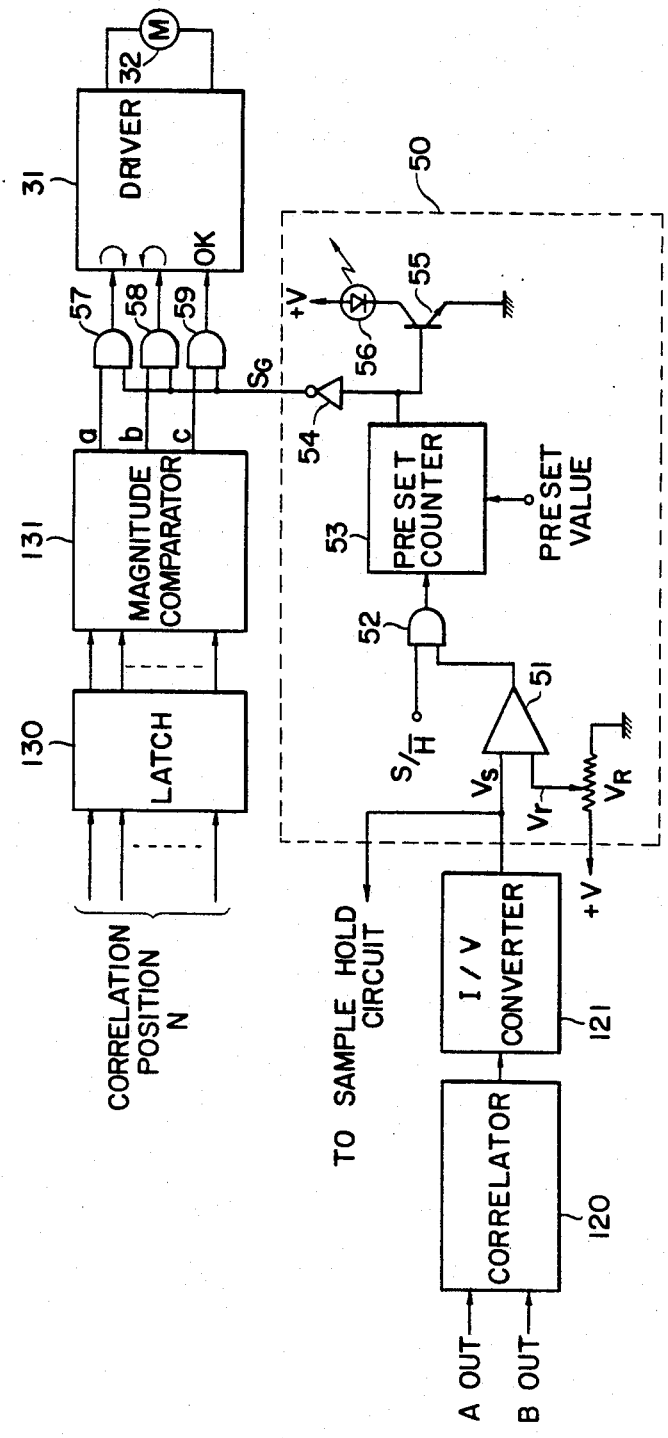

The parts (a) through (d) of FIG. 13 are time charts showing the waveforms of various output pulses in FIG. 12;

FIG. 14 is a circuit diagram showing one example of a binary encoder in FIG. 10;

The parts (a) and (b) of FIG. 15 are waveform diagrams for a description of the operation of the binary encoder in FIG. 14;

FIG. 16 is a block diagram showing a shift regster section;

FIG. 17 is a block diagram showing a correlation position detecting section;

FIG. 18 is a block diagram showing one example of a correlator in FIG. 17 in detail;

FIG. 19 is an explanatory diagram for a description of the operation of shift registers in the shift register section in FIG. 16 and the correlator in FIG. 17;

FIG. 20 is a graphical representation for a description of the operation of the correlation position detecting section;

FIG. 21 is a block diagram showing a motor drive section and a display section;

FIG. 22 is a block diagram of a clock pulse generating section;

FIG. 23 is a block diagram of a sequence control section;

The parts (a) and (b) of FIG. 24 are graphical representations indicating correlation outputs in the case when an object to be photographed is like a grid or stripes, and it is low in contrast; and FIG. 25 is a block diagram showing one example of an automatic focusing device according to this invention.

DETAILED DESCRIPTION OF THE INVENTION

As conducive to a full understanding of this invention, first a principle of detecting a focusing position according to the invention will be described.

Figure 1:
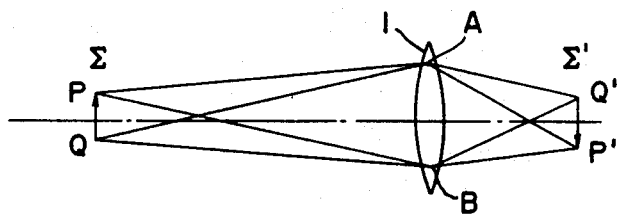
FIGS. 1 through 3 are optical path diagrams for a description of the principle of an automatic focusing device to which this invention is applied.

FIG. 1 shows the image $\Sigma'$ of an object $\Sigma$ which is formed by a lens 1. A light beam from a point P on the object $\Sigma$ which passes through a point A in the upper half of the lens 1 concentrates at a point P' on the image $\Sigma'$, and a light beam from the point P on the object $\Sigma$ which passes through a point B in the lower half of the lens 1 also concentrates at the point P' on the image $\Sigma'$.

Figure 2:
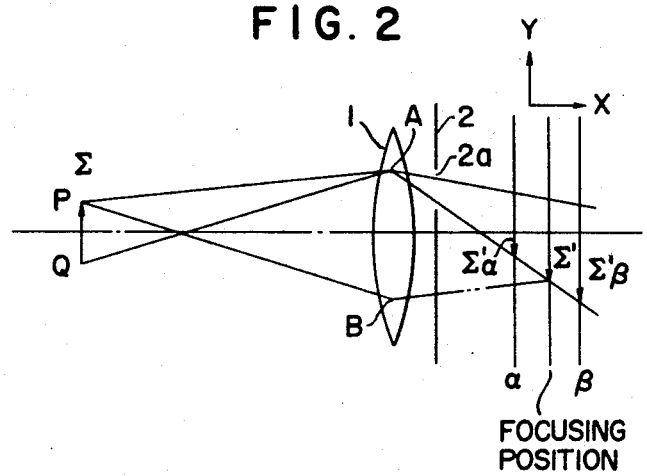

It is assumed that a blade 2 having an aperture $2a$ is provided as shown in FIG. 2, in order to consider only the image which is formed by the light beam which passes through the point A in the lens 1. In this case, with respect to the image $\Sigma'$ at the focusing position, an image $\Sigma'\alpha$ formed at a defocusing position $\alpha$ is shifted in the positive direction of Y-axis, and an image $\Sigma'\beta$ formed at a defocusing position $\beta$ is shifted in the negative direction of Y-axis.

Figure 3:
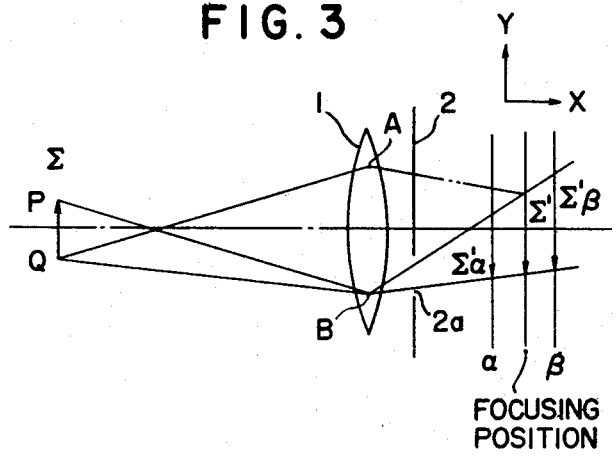

Similarly, it is asumed that the blade 2 is set as shown in FIG. 3, in order to consider only the image which is formed by the light beam which passes through the point B in the lens 1. In this case, with respect to the image $\Sigma'$ at the focusing position, an image $\Sigma'\alpha$ formed at a defocusing position $\alpha$ is shifted in the negative direction of Y-axis, and an image $\Sigma'\beta$ formed at a defocusing position $\beta$ is shifted in the positive direction of Y-axis.

At the same time, the high frequency components of the images at the defocusing positions $\alpha$ and $\beta$ are lost; that is, the images are foggy, and are low in contrast.

Figure 4:
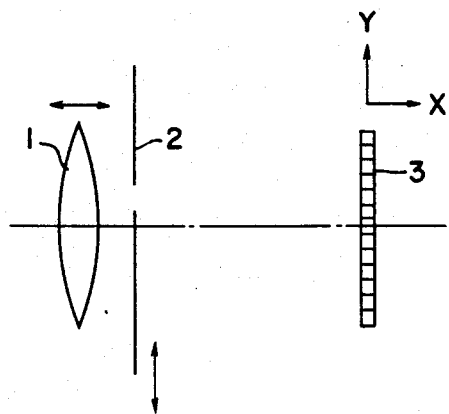
FIG. 4 is an explanatory diagram showing the arrangement of a photographing lens, a blade and a sensor array for detecting the intensity distribution of an object to be photographed.

In order to detect the intensity distribution of the image, an optical sensor array 3 is disposed in the Y-axis direction as shown in FIG. 4.

Figure 5:
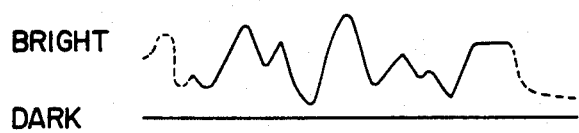
FIG. 5 is a diagram showing the intensity distribution of the object.
Figure 6A:
FIG. 6 is a diagram showing the intensity distributions of images A and B when the photographing lens is focused on the object.
Figure 6B:

If the intensity distribution of the object is as shown in FIG. 5, and the sensor array 3 is set at the focusing position, then both the intensity distribution of the image which is formed by the pencil of rays passed through the point A in the lens 1 (hereinafter referred to as "the image A" when applicable) and the intensity distribution of the image which is formed by the pencil of rays passed through the point B in the lens 1 (hereinafter referred to as "the image B" when applicable) are similar to that of the object in FIG. 1 and are similar in position to one another.

If the sensor array 3 is set at the defocusing position $\alpha$ in FIG. 2 or 3 (or the photographing lens 1 is set closer to the sensor array 3 which is at the correct position), the high frequency components of the image are lost, and as shown in FIG. 7 the image A is shifted in the positive direction of Y-axis, while the image B is shifted in the negative direction of Y-axis.

Under the condition that the points A and B are equally spaced from the optical axis, the amounts of shift of the images A and B are equal in magnitude but opposite in direction. Accordingly, the sum $\delta$ of the amounts of shift is twice one of the amounts of shift.

If the sensor array 3 is set at the defocusing position $\beta$ in FIG. 2 or 3 (or the photographing lens 1 is set away from the sensor array 3 which is at the correct position), the images A and B are similarly shifted with the same amount of composite shift $\delta$, but in the directions opposite to those in the above-described case.

If, when with respect to the image A the image B is shifted in the negative direction of Y-axis, the lens 1 is moved away from the sensor array 3, then the sensor array 3 approaches the focusing plane. If, when with respect to the image A the image B is shifted in the positive direction of Y-axis, the lens 1 is moved towards the sensor array 3, then the sensor array 3 approaches the focusing plane. Thus, if the sensor array 3 is set in a position in conjugation with a film surface (or an image pickup plane), then a lens driving direction to which the lens is moved for focusing can be detected.

An automatic focusing device employing the above-described principle will be briefly described with reference to FIG. 8.

The automatic focusing device, as shown in FIG. 8, comprises: an intensity distribution detecting section 10 for detecting, as video signals, the variations in intensity of the images of an object which are formed by light beams passing through different portions of a photographing optical system in a photographing device; a signal processing circuit 20 for processing the video signals thus detected, to detect the focus conditions of the photographing device and for deliverying, when the photographing device is in defocus condition, a drive direction signal to move the lens in the photographing optical system in the focusing direction; a lens drive device 30 for moving, while the drive direction signal is being delivered, the lens in the photographing optical system in the specified direction; and a display unit 40 for displaying the focus conditions of the photographing device.

In the intensity distribution detecting section 10, the images of the object are formed on the light receiving surfaces of a sensor array 16A and a sensor array 16B by light beams passing through the right and left halves of a focusing lens 11 forming the photographing optical system with the aid of lenses 15A and 15B, respectively. (In practice, the images of the sensor arrays are formed correctly on the light receiving surfaces only when the lens is focused on the object).

Accumulation mode type image sensor arrays, such as one-dimensional CCD image sensor arrays are employed as the aforementioned sensor arrays. The charge accumulation time of each sensor array is controlled by a sensor driver 17 according to object's brightness data. The intensity (density) distribution of the object's images are detected as video signals (corresponding to the light and dark of each light receiving point) whose levels are not affected by the object's brightness.

In the signal processing circuit 20, the video signals detected by the sensor arrays 16A and 16B are applied to binary encoders 21A and 21B, where they are converted into binary signals represented by "1" and "0", respectively. The binary signals are temporarily stored as an A data (or the intensity distribution data of the object's image formed by the light beam passing through the right half of the photographing lens) and a B data (or the intensity distribution data of the object's image formed by the light beam passing through the left half of the photographing lens) in memories 22A and 22B, respectively.

The relation between the A and B data stored in the memories 22A and 22B is shifted little by little. Whenever the shift is carried out, the correlation is detected by a correlator 23, and the peak position of the correlation output is detected by a peak detector 24. Depending on the number of times of relative shifting of the A and B data corresponding to the peak position detected by the peak detector 24, a drive direction detector 25 discriminates focusing and defocusing conditions and a direction in which the focusing lens 11 should be moved for focalization when the defocusing condition is detected, so that it delivers a focusing signal when the lens is focused and a drive direction signal when defocused.

A sequence controller 26 operates to control the operations of the various circuit elements in the signal processing circuit 20 in synchronization with the video signal output timing of the sensor arrays 16A and 16B controlled by the sensor driver 17. A lens drive device 30 comprises: a drive circuit 31; a motor 32; and a gear mechanism 33 adapted to convert the rotation of the motor into a linear motion thereby to move the focusing lens 11 in the direction of the arrow P or Q. While the drive direction signal is being delivered by the drive direction detector 25, the driver circuit 31 turns the motor 32 clockwise or counterclockwise according to the specified direction, to move the focusing lens 11 in the direction of the arrow P or Q. When the focusing signal is delivered by the drive direction detector 25, the motor 32 is braked to stop the focusing lens 11.

A display unit 40 operates to display front focusing, rear focusing and focusing by light emitting diodes different in color according to the drive direction signals and the focusing signal which are applied to the driver circuit 31.

The automatic focusing device thus organized will be described concretely.

First, with respect to the optical system of the intensity distribution detecting section 10, one example of the case where the automatic focus control device is applied to a photographing device such as a still picture camera, a motion picture camera or a video camera will be described with reference to FIG. 9.

A photographing optical system, namely, a 3-group zoom lens is constituted by the focusing lens 11, a variable magnification lens 12 and an image forming lens 13. When the lens is focused, parallel light beams are provided between the variable magnification lens 12 and the image forming lens 13. Each of the lenses 11, 12 and 13 appears as one lens in FIG. 9; however, it should be noted that, in practice, it is constituted by a plurality of lenses.

A prism spectroscope 14 is interposed between the variable magnification lens 12 and the image forming lens 13, in order to direct a part of the photographing light beam downwardly. Detecting lenses 15A and 15B equivalent to the image forming lens 13 are disposed as shown in FIG. 9, and sensor arrays 16A and 16B are arranged at a position in conjugation with the position of a film surface F.

Thus, the image of an object by a light beam A passing through the right half of the focusing lens 11 is formed on the sensor array 16A by the lens 15A, while the image of the object by a light beam B passing through the left half of the focusing lens 11 is formed on the sensor array 16B by the lens 15B. A light intercepting plate 18 is provided between the lenses 15A and 15B so that the two light beams do not interfere with each other.

With the arrangement described above, the intensity distributions of the image by the light beam A and the image by the light beam B can be detected by the sensor arrays 16A and 16B simultaneously without using a movable member such as a blade (in practice, the halves of one sensor array being used as the sensor arrays 16A and 16B, respectively).

Similarly as in the case of FIG. 8, the focusing lens 11 is focused on the object by being moved in the direction of the arrow P or Q by a gear mechanism 33 with a rack and a pinion which is driven by a motor 32.

Now, the sensor driver and the signal processing circuit will be described.

FIG. 10 is a block diagram of a data detecting section.

A sensor array 16 has a 256-bit light receiving elements. A half of 256 bits, i.e. 128 bits is used to detect the intensity distribution of the image by the light beam A in FIG. 9, and the remaining 128 bits is used to detect the intensity distribution of the image by the light beam B. In other words, the sensor array 16 is obtained by combining the two sensor arrays 16A and 16B into one.

The sensor array 16 is driven by the sensor driver 17 the accumulation time of which is controlled by a light-frequency conversion circuit 41.

In FIG. 10, reference numeral 104 designates a low pass filter; 105, an amplifier; and 21, a binary encoder for binary-encoding each bit of the video signal which is outputted by the amplifier 105, the binary encoder 21 corresponding to the binary encoders 21A and 21B in FIG. 8.

A shift register 107 and a control logic circuit 108 form a speed conversion section for carrying out a signal processing operation with a microcomputer. The shift register 107 is a 256-bit shift register capable of storing the 256-bit data of the sensor array 16. In FIG. 10, reference character D designates data; ST, a start signal; CLK, a clock input; and RDYW, a signal which is set to "0" only when the start signal ST is at "1" and a ready signal RDY which is raised to "1" after the data from the sensor array 16 has been transferred is at "0", the signal RDYW being at "1" in the other cases.

The sensor driver 17 and the light-frequency conversion circuit 14 are arranged as shown in FIG. 12, for instance.

The conversion circuit 41 comprises a capacitor C1, a resistor R1, and an oscillator circuit 46 with a photo-cell 45 as a time constant element, to deliver a square wave signal $S\gamma$ whose frequency varies with a quantity of incident light $\gamma$. Therefore, the period T of the square wave signal $S\gamma$ decreases with increasing the quantity of incident light $\gamma$, or increases with decreasing the quantity of incident light.

The one-shot multivibrator 42 is triggered, for instance, by the fall of the square wave signal $S\gamma$, to output a shift pulse $\phi x$ having a predetermined pulse width at a period T as shown in the part (a) of FIG. 13. The period T of the shift pulse $\phi x$ is the charge accumulation time of the CCD image sensor array 116.

The oscillator 43 applies, for instance, a 2 MHz oscillation output to the clock pulse generating circuit 44, as a result of which the latter 44 outputs a reset clock pulse $\phi_R$ and transfer clock pulses $\phi_1$ and $\phi_2$ which are two-phase clock pulses opposite in phase as shown in the parts (b) and (c). These clock pulses are applied to the sensor array 16.

The sensor array 16 is driven by the shift pulse $\phi x$, the transfer pulses $\phi_1$ and $\phi_2$ and the reset pulse $\phi_R$, to successively output signals corresponding to the intensity distribution of the received image.

FIG. 14 shows one example of the binary encoder 21. The peak value of the input signal Sv is held by a circuit made up of an operational amplifier 47, a diode $D_2$, resistors $R_2$ and $R_3$ and a capacitor $C_2$, so that a signal Vc as indicated by the broken line in FIG. 15 is obtained. The signal Vc is suitably amplified by an amplifier circuit made up of an operational amplifier 48 and resistors $R_4$ through $R_6$ to provide a comparison voltage Vref. The comparison voltage Vref is compared with the input signal Sv in a comparator or an operational amplifier 49. When Sv≧Vref, the operational amplifier 49 provides a binary-coded output Dv at a logic level "1", and when Sv<Vref, a binary-coded output Dv at a logic level "0" is delivered, as shown in the part (b) of FIG. 15.

Referring back to FIG. 10, when the start signal ST is applied to the control logic circuit 108 by a sequence control section (FIG. 23) described later (the sequence controller 26 in FIG. 8 including the sequence control section and the control logic circuit), a video signal representative of the image intensity distribution which has been accumulated in the sensor array 16 with the charge accumulation time T (cf. FIG. 13) corresponding to the object's brightness is delivered. The video signal is applied through a low-pass filter 104 and the amplifier 105 to the binary encoder 106, where it is binary-encoded and is then transferred to the 256-bit shift register 107. When the 256-bit data has been transferred, the signal RDYW is raised to "1".

FIG. 16 is a block diagram of a shift register section in which the data stored in the shift register 17 is distributed into data (A data) by the light beam A and data (B data) by the light beam B for arrangement.

The shift register section comprises: a 128-bit shift register 110 (corresponding to the memory 22A in FIG. 8) for A data; a 128-bit shift register 111 (corresponding to the memory 22B in FIG. 8) for B data; multiplexers 112 and 113 and selectors 114 and 115.

When a signal SEL$\overline{AB}$ from the sequence control section (FIG. 23) described later is at "1", the multiplexer 112 applies the input data D to the selector 114; and when the signal SEL$\overline{AB}$ is at "0", the multiplexer 113 applies the input data D to the selector 115.

The selectors 114 and 115 apply input data DA and DB from the multiplexer 112 to the shift registers 110 and 111, respectively, when a signal CNT from the sequence control section is at "1". When the signal CNT is at "0", the selectors 114 and 115 are switched to return data from the output sides (out) of the shift registers 110 and 111 to the input sides thereof, respectively.

The multiplexer 113 receives a clock pulse CLKOUT from a clock pulse generating section (FIG. 22) described later, and applies a clock pulse CLKA to the shift register 110 and a correlator 120 (FIG. 17) described later when the signal SEL$\overline{AB}$ is at "1". When the signal SEL$\overline{AB}$ is at "0", the multiplexer applies a clock pulse CLKB to the shift register 111 and the correlator 120.

Thus, first with the signal CNT at "1", the signal SEL$\overline{AB}$ is raised to "1", and the data D stored in the shift register 107 in FIG. 10 is transferred through the multiplexer 112 and 114 to the shift register 110. Upon application of 128 clock pulses CLKOUT, the first half 128-bit A data DA of the shift register 107 is transferred to the shift register 110.

Next, the signal SEL$\overline{AB}$ is set to "0", and thereafter upon application of 128 clock pulses the second half 128-bit B data DB of the shift register 107 is transferred to the shift register 111.

After the 128-bit A data DA and the 128-bit B data DB have been arranged in the shift registers 110 and 111 respectively, the signal CNT is set to "0", as a result of which the selectors 114 and 115 are switched to return the data from the output sides of the shift registers 110 and 111 to the input sides thereof. Thereafter, with the aid of the clock pulses CLKA and CLKB, the required data are delivered out of the shift registers 110 and 111 to the correlator 120 described later.

FIG. 17 is a block diagram showing a correlation position detecting section corresponding to the correlator 23 and the peak detector 24 in FIG. 8. The correlation position detecting section comprises: the correlator 120; a current-voltage converter (or I-V converter) 121; a sample and hold circuit 122; a peak detector 123; an OR gate 124; and a counter 125.

The correlator 120 may be of "TC 1004J" manufactured by TRW company. The correlator 120, as shown in FIG. 18, comprises: two 64-bit shift registers 120A and 120B; EX-OR circuits $G_1$ through $G_{64}$ for subjecting corresponding bits to exclusive logic summation; and a circuit for adding the outputs of the EX-OR circuits through respective resistors $r_1$ through $r_{64}$ to obtain an output represented by a current value. As the A data of the shift register 120A coincides with the B data of the shift register 120B, the number of the outputs of the EX-OR circuits which are set to "0" is increased, and accordingly the output current $I_0$ is increased. The output current $I_0$ is converted into a voltage by the current-voltage converter 121; i.e. the correlation output is obtained.

The operation of transferring data from the shift registers 110 and 111 in FIG. 16 to a register 120A for the A data and a register 120B for the B data in the correlator 120 will be described with reference to FIG. 19.

In this embodiment, similarly as in the operation in which two halves of an image which have been shifted in the opposite directions through image splitting are coincident with each other to detect the focusing, the opposed halves of the A data DA and the B data DB stored in the shift registers 110 and 111 are shifted in the opposite directions bit by bit, to detect the correlation.

More specifically, the 64-bit data of the shift register 110, i.e. the left half of the data of the shift register 110 (indicated as a shaded portion in FIG. 19) and the 64-bit data of the shift register 111, i.e. the right half of the data of the shift register 111 (indicated as a shaded portion in FIG. 19) are transferred to the shift registers 120A and 120B, respectively, for detecting the correlation.

For this purpose, in the first correlation detection, 128 pulses CLKA are applied to the shift registers 110 and 120A, and 64 pulses CLKA are applied to the shift registers 111 and 120B.

When 128 pulses CLKA are applied to the shift register 110, all the data are transferred to the shift register 120A, and are returned back to the shift register 110. Thus, the shift register stores the A data under the same condition as the initial condition. Since the capacity of the shift register 120 is only 64 bits, the first half 64-bit data is eliminated by being pushed out, and therefore the second half 64-bit data, i.e. only the A data (indicated as a shaded portion in FIG. 19) is stored.

On the other hand, when 64 pulses CLKB are applied to the shift register 111, the right half of the data (indicated as a shaded portion in FIG. 19), i.e. the B data of 64 bits is transferred to the shift register 120B. Therefore, in the shift register 111, the data which was in the left half position is stored in the right half position, and the data which was in the right half position is stored in the left half position.

In the second correlation detection, 127 pulses CLKA are applied to the shift register 110, and one pulse CLKB is applied to the shift register 111.

As a result, the A data of 64 bits which is shifted by one bit to the right when compared with its state in the shift register 110 in the first correlation detection (as indicated by the phantom line in FIG. 19) is transferred to the shift register 120A. On the other hand, the B data of 64 bits which is shifted by one bit to the left when compared with its state in the shift register 111 in the first correlation detection is transferred to the shift register 120B.

Thus, in and after the second correlation detection, 127 pulses CLKA are applied to the shift registers 110 and 120A, and one pulse CLKB is applied to the shift registers 111 and 120B, to carry out the correlation detection sixty-four times. That is, the data indicated as the shaded portions in FIG. 19 are shifted in the opposite directions bit by bit until the data are completely in opposed state, to detect all the correlations.

In the thirty-second correlation detection, the correlation of the A data of 64 bits and the B data of 64 bits approximately in the central positions in the shift registers 110 and 111 (as indicated by the broken lines in FIG. 19) is detected. If, in this detection, the output of the correlator 120 is maximum, the photographing lens is in focus. If the correlation output is maximum in a correlation detection other than this correlation detection, then the photographing lens is out of focus as much.

Referring back to FIG. 17, the output current of the correlator 120 in each correlation detection is converted into a voltage by the I-V converter 121, and the voltage is applied to the sample hold circuit 122 and the peak detector 123.

Whenever the data of the shift registers 120A and 120B in the correlator 120 are correlated, a sampling signal S/$\overline{H}$ from the sequence control section (FIG. 23) described later is raised to "1", so as to sample an input signal to the sample hold circuit 122 from the I-V converter 121. In the first place, peak detector 123 samples the signal from I-V converter in a manner illustrated by FIG. 20, so that when the sampled value is higher than the preceding held value, the held value is renewed, and when the sampled value is lower than the preceding held value, the held value is continually held as it is.

Therefore, for instance in the case where the sample values in the correlation detections are varied as indicated by the solid line in FIG. 20, the held value follows the sample value while the latter is being increased; however, after the increase of the sample value reaches a peak value the peak value is held as indicated by the broken lines in FIG. 20 until a sample value higher than the peak value is provided.

In the second place, the peak detector compares these two values-solid line with broken line in FIG. 20. When the broken line is not higher than the solid line, the peak output is raised to "1". The peak output "1" is applied through the OR gate 124 to the counter 125 to reset the latter 125.

Therefore, the counter 125 is maintained reset as indicated in FIG. 20 until the correlation output reaches a peak value. Thereafter, the counter 125 counts the sampling signal S/$\overline{H}$; however, it is reset again when the correlation output reaches a peak value which is larger than the preceding peak value. When the sixty-fourth sampling, or the sixty-fourth correlation detection has been achieved, the count value which is obtained by counting the sampling signal after the occurrence of the maximum peak value is held in the counter 125. This count value is delivered as an output, as a correlation position data, by the counter 125.

This count value of the counter is reset for the time interval which elapses after the start signal ST is raised to "1", i.e. the data accumulation of the sensor array 101 is started, until the time instant that the data are transferred to the shift registers 110 and 111.

FIG. 21 is a block diagram showing a motor drive and display section. This section comprises a latch circuit 130, a magnitude comparator (or a digital comparator) 131, and LED (light emitting diode) and motor driver 132.

The latch circuit 130 latches the correlation position data which is delivered as the counter value of the counter 125 described above, when the signal STRB from the sequence control section (FIG. 21) is raised to "1".

The magnitude comparator 131 is set to a value thirty-two (32). In the magnitude comparator 131, the correlation position data latched by the latch circuit 130 (hereinafter referred to as "a correlation position data N" when applicable) is compared with (32). If N>32, an output a of the comparator 131 is raised to "1"; if N<32, an output b of the comparator 131 is raised to "1"; and if N=32, an output c of the comparator 131 is raised to "1".

The LED and motor driver 132 operate to roate the motor 133 in one direction and to turn on a light emitting diode L1 indicating the front focus when the output a described above is at "1"; and to rotate the motor in the opposite direction and to turn on a light emitting diode L2 indicating the rear focus when the output b is at "1".

Thus, the photographing lens (not shown) is moved to be in focus by the rotation of the motor. When the photographing lens is focused on the object, the output c of the magnitude comparator 131 is raised to "1", as a result of which the motor 133 is braked and a light emitting diode L3 is turned on to indicate the focusing.

During the motor driving operation, the above-described sequence is repeatedly carried out, so that in a motion picture camera or a video camera the focus adjustment is carried out following the movement of an object at all times. In the case of a still camera, the shutter can be released after the light emitting diode indicating the focusing has been turned on.

After the motor has been rotated in the required direction, the motor can be stopped by detecting the focusing by using a contrast check circuit as shown in FIG. 25.

If an automatic/manual change-over switch 134 is turned off, the motor 133 is not rotated, and one of the light emitting diodes is turned on. Therefore, in this case, the photographing lens can be manually focused on an object with the focusing checked.

FIG. 22 is a block diagram showing a clock pulse generating section. This section comprises, a latch circuit 140 for latching a preset numerical value (n), a counter 141, a clock pulse oscillator 142, a one-shot multivibrator 143, a group of EX-OR circuits 144 for the output bits of the latch circuit 140 and the counter 141, an OR circuit 145 for receiving the outputs of the EX-OR circuits 142, and an AND gate 146.

In order to supply clock pulses CLKOUT as many as necessary for the operations of the above-described various circuit elements, the necessary number is given, as a preset value, by the sequence control section (described later). When a signal BGN is raised to "1", the one-shot multivibrator 143 is triggered by the rise of the signal BGN, the output of the one-shot multi-vibrator 143 is latched by the latch circuit 140, and the counter 141 is reset.

At the same time, the output of the OR circuit 145 is set to "1", and while the output clock pulse of the clock pulse oscillator 146 is provided through the AND gate 146, the output clock pulse is counted by the counter 141.

When the count value of the counter 141 reaches the preset value latched in the latch circuit 140, all of the outputs of the EX-OR circuits 144 are set to "0". As a result, the output of the OR circuit 145 is set to "0", to close the AND gate 146, and therefore the delivery of the clock pulse is suspended.

The output of the OR circuit 145, i.e. a signal BSY is maintained at "1" while the clock pulse is being delivered, so as to stop the advancement of the sequence of the sequence control section (FIG. 23) described later.

The above-described operations in the various circuit elements are controlled by the sequence control section shown in FIG. 23.

The sequence control section comprises a 4-MHz oscillator 150, a frequency divider 151 for subjecting the output of the oscillator 150 to ¼ frequency division, a counter for counting the output of the frequency divider 151, a read-only memory (ROM) 153 which is addressed by the count value of the counter 152, and 7-bit latch circuits 154 and 155 for latching the output data of the ROM 153.

The data of operating signals necessary for the sequence control and the data of the preset value which is to be applied to the above-described clock pulse generating section are stored in 8-bit memories by using seven bits beginning with the 0-th address, and a signal EXH for selecting the latch circuits 154 and 155 is stored by using the remaining one bit. The operating signals RST, ST, BGN, SELAB, CNT, S/H and STRB are each stored, as "1" or "0", in one of the seven bits.

An address in the ROM 153 is specified according to the count value of the counter 152, so that the data in the address thus specified is read out. If the signal EXH is at "1", an AND gate 156 is opened, so that the data thus read is latched by the latch circuit 154 with the timing that the output of an AND gate 159 is raised to "1". When the signal EXH is at "0", the output of an inverter 158 is raised to "1" to open an AND gate 157, so that the data read out is latched by the latch circuit 155.

After the counter 152 has counted up, there is a little time before all the data in an address newly specified are provided at the output of the ROM 153. Therefore, the counter 152 is counted up with the fall of a pulsed signal CK4 which is obtained by subjecting the 4-MHz pulse signal CK1 of the oscillator 150 to ¼ frequency division, and the pulse signal CK4 and the 4-MHz pulse signal are applied to the AND circuit 159. When the output of the AND circuit 159 is raised to "1", i.e. after a half period of the pulse signal CK4, the latch circuit 154 or 155 is strobed.

When the above-described signal RDYW is at "0", i.e. for the time interval which elapses from the start of the data accumulation of the sensor array 101 in the data detecting section in FIG. 10 until the data have been transferred to the shift register 107, the AND gate 160 is maintained closed. Furthermore, in the case when the signal BSY from the above-described clock pulse generating section is at "1", and its inverted signal $\overline{BSY}$ is at "0", the AND gate 160 is closed, to prevent the count-up of the counter 152, thereby to stop the advancement of the sequence.

When the signal RST is raised to "1", the output of the one-shot multivibrator 161 is set to "0" in a short time. This output is applied through an inversion input type OR circuit 162 to the counter 152 to reset the latter 152. When the power switch is turned on, a point g in an initial reset circuit 163 is at "0". This low level data "0" is applied through the OR circuit 162 to the counter 152 to reset the latter 152.

When a grid-shaped or stripe-shaped object is photographed with a camera having the above-described automatic focusing device, the correlation output Vs which is a voltage signal obtained by converting the correlator 120 in FIG. 17 with the I-V converter 121 has many peaks, as shown in the part (a) of FIG. 24. Accordingly, the focusing condition cannot be detected from the peak position.

In the case where an object to be photographed is considerably high in contrast, the correlation output Vs is continuously high in level as shown in the part (b) of FIG. 24; that is, no clear peak appears in the correlation output.

In this case, the drive direction signal a or b and the focusing signal c outputted by the magnitude comparator 131 in FIG. 21 are unreliable. Accordingly, the position of the photographing lens is greatly shifted from the focusing position, or the hunting phenomenon occurs with the photographing lens, as a result of which the resultant picture is undoubtedly poor in quality.

Thus, basing on the fact that in such cases as described above the probability that the correlation output becomes high in level is high, in the invention it is counted how many times the correlation output becomes a certain level or higher, and when the count value reaches a predetermined value, the drive direction signal a or b outputted by the magnitude comparator 131 is made ineffective to stop the motor and a warning display is carried out.

FIG. 25 is a block diagram showing one example of an automatic focusing device according to the invention. In FIG. 25, those components which have been previously described with reference to FIGS. 17 and 21 are therefore similarly numbered.

A voltage signal obtained by converting the output of the correlator 120 with the I-V converter 121, i.e. a correlation output Vs is applied to a comparator 51, where it is compared with a reference voltage Vr preset by variable resistor $V_R$.

This reference voltage is so set that it corresponds to the correlation output Vs which is provided when the A data and the B data coincide, for instance 90%, with each other. The relationships between the reference voltage Vr and the correlation output Vs are as indicated in the parts (a) and (b) of FIG. 24.

When Vs<Vr, the output of the comparator 51 is at "0"; and when Vs≧Vr, the output is raised to "1", whereby when the A data and the B data coincide, for instance more than 90%, with each other, an AND gate 52 is opened to pass the sampling and holding clock pulse S/H̄, which is applied to a preset counter 53.

The clock pulse S/H̄ thus applied is counted by the preset counter 53. When the count value reaches a preset value (for instance sixteen (16)), the preset counter 53 provides an output "1".

As a result, the output of an inverter 54 is set to "0", and simultaneously a transistor 55 is rendered conductive to turn on a light emitting diode (LED) 56, thereby to indicate the fact that the automatic focusing is impossible.

A low contrast detecting circuit 50 is arranged as described above.

If it is unnecessary to change the preset value of the counter, instead of the preset counter, a counter capable of counting up to a desired count value may be used, to provide the most significant bit thereof as the output.

The drive direction signals a and b and the focusing signal c delivered by the magnitude comparator 131 are applied to the driver 31 through AND gates 57, 58 and 59, respectively. These AND gates 57, 58 and 59 are controlled by the output of the low contrast detecting circuit 50, i.e. the output $S_G$ of the inverter 54.

Accordingly, when the count value of the preset counter 53 reaches the preset value, then the AND gates 57, 58 and 59 are closed, and none of the signals a, b and c are applied to the driver 31; that is, even if any one of the signals a, b and c is outputted, it is made ineffective.

Accordingly, the motor 32 is maintained stopped, and the focusing lens 11 (FIG. 9) is not moved. The reason why the application of the focusing signal c is also suspended is that the trouble that although the lens is not focused on the object, the focusing signal is outputted to brake the motor 32 is prevented, and when the fact that the automatic focusing is impossible is displayed by the light emitting diode (LED) 56, the lens can be manually forcused on the object.

In the above described example, the intensity distributions of the object's images passing through the different portions of the photographing optical system are led to a position different from that of the photographing image and are detected by the one-dimensional CCD image sensor array. However, in a video camera in which the photographing image is converted into an electrical signal with a two-dimensional image pickup element, the detection can be carried out by extracting at least one of the two intensity distributions from the photographing video signal or by utilizing the blanking portion of the image pickup element.

It is obvious that the technical concept of the invention is similarly applicable to an automatic focusing device in a camera using no zooming lens.

As is apparent from the above description, the automatic focusing device which has been proposed by the inventors before are improved as follows: The troubles that, when a grid-shaped or stripe-shaped object is photographed or an object is considerably low in contrast, the hunting phenomenon occurs with the photographing lens or the photographing lens becomes unstable in operation, can be prevented. In addition, the fact that the automatic focusing is impossible is displayed, and therefore the photographing lens can be focused manually without delay. Accordingly, the resultant picture is high in quality.

What is claimed is:

1. In an automatic focusing device comprising: intensity distribution detecting means for detecting the intensity distribution of images of an object being photographed and formed by light rays passing through a photographing optical system of a photographic apparatus and for developing video signals corresponding to the intensity distribution; a signal processing circuit receptive of the video signals and having means for storing the video signals, means for subjecting the video signals to relative movement little by little and for determining the correlation of the signals, at each relative movement including means for developing a correlation output representative of said correlation;

means for detecting whether the photographing optical system is focused or not by detection of the peak position of said correlation output and including means for generating a drive direction signal in response to the peak position of said peak position is not representative of a focused condition of the photographing optical system, a lens in said photographing optical system, means driven by the drive direction signal in a direction for focusing the photographing optical system as long as said drive direction signal is delivered, the improvement comprising:

a low contrast detecting circuit having counting means for counting how many times the correlation output is higher than a predetermined level in a detection operation of the focusing condition by said signal processing circuit and to provide a count value, means for rendering the drive direction signal ineffective when said count valve reaches a predetermined value, and warning means for presenting a warning display when said count value reaches said predetermined level.

2. In an automatic focusing device according to claim 1, in which said low contrast detecting circuit comprises a comparator, a reference voltage source connected to said comparator set to have a value corresponding to a correlation signal obtained when the detected intensity distribution has a predetermined relationship thereamong, a clock pulse source, an AND gate open when said relationship is established to pass clock pulses from the clock pulse source, said counting means comprising a preset counter connected to said AND gate for counting the clock pulses until the counted value reaches said predetermined value and deliverying an output signal when said count reaches said predetermined value, said means for rendering said drive direction signal ineffective comprising an inverter receptive of the output signal of the preset counter.

* * * * *